3,467,101
BALLOON CATHETER
Thomas J. Fogarty, Bethesda, Md., and Donald A. Raible, Corona, and William A. Stark, Costa Mesa, Calif.; said Donald A. Raible and William A. Stark, assignors to Edwards Laboratories, Inc., a corporation of California
Continuation-in-part of application Ser. No. 370,430, May 27, 1964. This application Sept. 30, 1965, Ser. No. 491,712
Int. Cl. A61m 25/00, 29/00
U.S. Cl. 128—348            11 Claims

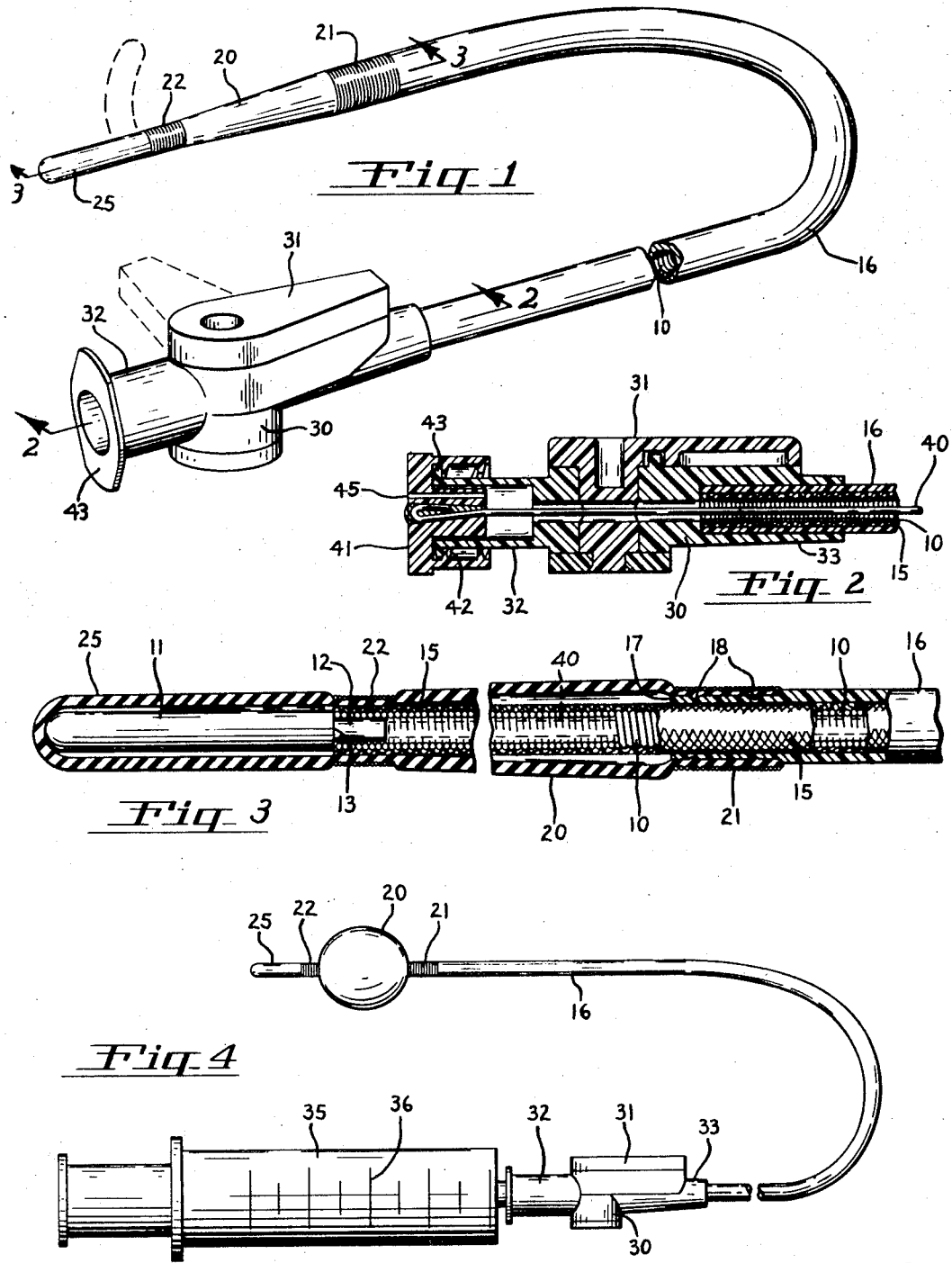
Sept. 16, 1969     T. J. FOGARTY ET AL     3,467,101
BALLOON CATHETER
Filed Sept. 30, 1965
INVENTORS
THOMAS J. FOGARTY
DONALD A. RAIBLE
WILLIAM A. STARK
Attorney United States Patent Office 3,467,101
Patented Sept. 16, 1969

ABSTRACT OF THE DISCLOSURE

The catheter has a metal lumen comprising a wire coil to prevent damage from the repeated insertion of a wire stylet. A tube of fabric braid provides a tension member to prevent stretching of the coil under tension and to prevent separation of the turns of the coil by the end of the stylet. The catheter may be made with different types of tips for venous thrombectomy, arterial embolectomy and other purposes.

---

This application is a continuation-in-part of Ser. No. 370,430 filed May 27, 1964, Embolectomy Catheter.

This invention relates to certain improvements in the balloon catheter disclosed in said prior application.

The catheter body tube in said prior application is made of a relatively soft plastic material, such as polyvinyl, polyethylene, polypropylene, and the like. It has become the practice to use the catheters repeatedly and to insert a metal wire stylet during periods of non-use to prevent acute angulation and afford a degree of protection for the catheter. It is found that the introduction of metal stylets, if repeated and not carefully done, tends to scrape off some of the plastic material and causes accumulation of such material within the lumen of the catheter. This results eventually in occlusion of the lumen and prevents inflation of the balloon.

This condition is aggravated by the tight binding of the balloon on the catheter body tube. Increased temperatures during sterilization result in a degree of deformity in the binding areas with contraction of the lumen. This makes it difficult to reintroduce the stylet and increases the likelihood that the stylet will scrape off some of the plastic material from the wall of the lumen when it is forced through the constriction.

The general object of the present invention is, therefore, to increase the durability and strength of the catheter to withstand repeated usage. More specific objects are to reenforce the catheter tube without impairing its flexibility in bending, to provide a catheter body tube in which its lumen cannot become constructed, to provide a catheter body tube having a lumen with a flexible metal wall which cannot be damaged by repeated insertion of a stylet, to provide a balloon catheter having improved securement for the ends of the inflatable portion of the balloon, to provide a balloon catheter in which the balloon is protected against puncture by the stylet, to provide a catheter having an improved tip construction, to provide a balloon catheter having an integral shut-off valve to maintain the inflation of the balloon and to provide an improved stylet for a catheter of the type described.

The present catheter body has a hollow inner core formed of a metal wire coil. A sleeve of braided material is placed over the core and is covered by an outer coating which comprises a tube of heat shrinkable plastic which is shrunk on the braid and core. The inner core provides a flexible metal wall for the lumen which is not damaged by introduction of the stylet and resists radial deformation under the tight windings which secure the balloon. The coil form of the core does not impair flexibility in bending but provides a substantially rigid base for the windings. The braided sleeve prevents separation of the turns of the coil that would permit catheter elongation when the catheter is withdrawn under tension with the balloon inflated.

An improved catheter tip construction retains the desired flexibility for passing the venous valves while providing improved security against separation of the tip from the catheter body tube. A shut-off valve is provided on the proximal end and an improved stylet is provided which may be secured to a syringe fitting on the valve.

The invention will be better understood and the foregoing and other objects and advantages will become apparent from the following description of the preferred embodiment illustrated on the accompanying drawing. Various changes may be made, however, in the details of construction and arrangement of parts and certain features may be used without others. All such modifications within the scope of the appended claims are included in the invention.

In the drawing:

FIGURE 1 is a perspective view with parts broken away, showing a balloon catheter embodying the features of the invention;

FIGURE 2 is a view taken on the line 2—2 in FIGURE 1 and showing the stylet inserted;

FIGURE 3 is an enlarged view taken on the line 3—3 in FIGURE 1; and

FIGURE 4 is a view showing the balloon expanded by a syringe.

The drawing illustrates a venous thrombectomy catheter but the same construction is used for other fields of pathology, such as the genito-urinary tract and the biliary system. For the latter uses, the tube would be shorter than for thrombectomy purposes. Most of the important features of the invention may also be employed in an arterial embolectomy catheter.

The catheter is built on a core 10 comprising a coil of spring wire of suitable material such as stainless steel. The coil is wound so that adjacent turns are in contact with each other. A soft rubber plug 11 of suitable plastic such as neoprene is affixed on the distal end of the coil 10. This plug forms a flexible tip which will readily bend back on itself at a relatively sharp angle as shown in broken lines in FIGURE 1 for passing through the venous valves according to the technique illustrated in FIGURE 5 in said Ser. No. 370,430. The plug has a reduced end portion 12 which is secured by a suitable cement such as epoxy resin in the end of the coil 10. The transition to the reduced end portion provides a shoulder at 13 having a thickness equal to the thickness of the wire in coil 10 whereby the large end portion of the plug 11 has the same diameter as the outside diameter of coil 10.

The outer surface of coil 10 is covered with a braid 15 of suitable non-reactive and non-hygroscopic material, such as Dacron, Teflon, or the like. This material is braided directly on the body coil 10. Braid 15 continues in a distal direction to the shoulder 13. Then the braid 15 is covered with an outer plastic tube 16 which is drawn on over the braid and positioned with its distal end at 17 a short distance from the plug 11. Tube 16 is of a suitable heat shrinkable material such as polyvinyl or other shrinkable plastic. Tube 16 is heat shrunk onto the braid 15 and underlying coil 10 which is substantially rigid in a radial direction. In order to make the tube grip the coil as tightly as possible, the tube is preferably tensioned and stretched longtiudinally as it is being shrunk on the coil.

Circumferential balloon hold-down grooves 18 are cut in the tube 16 adjacent to its end 17 and balloon 20 is drawn over the plug 11 and grooves 18 as shown. The proximal end of the balloon is secured to the distal end of tube 16 by a winding 21 of suitable material such as a Dacron braided suture. An intermediate portion of the balloon is secured in a similar manner by a winding 22 which overlies the reduced end 12 of plug 11.

Under the winding 21 the balloon is preferably cemented to tube 16 by a suitable adhesive such as epoxy resin and under the winding 22 the balloon is preferably similarly cemented to the braid 15. Such adhesive is also applied to the windings themselves. Additionally, prior to applying the braid, the coil 10 is coated with the adhesive on its proximal end portion and in the areas which are to underlie the windings 21 and 22 to anchor and braid to the coil at these three points.

The balloon is made of a strong elastic material such as latex rubber or a plastic elastomer whereby it will expand to a spherical shape when unconfined and inflated as shown in FIGURE 4. In order to inflate and deflate the balloon, a number of turns of the coil 10 are very slightly separated from each other in the interval between the windings 21 and 22 whereby an inflating fluid introduced into the proximal end of the lumen of coil 10 will pass freely through the separated turns and inflate this portion of the balloon as shown. The coil is not fluid tight, however, and will pass inflating fluid even when the turns are not separated.

Extending distally from the winding 22, the balloon has a closed end portion 25 which merely encloses the plug 11 and does not inflate. As shown, the windings 21 and 22 compress the balloon material and also the plastic tube 16 whereby these windings do not increase the diameter of the catheter body and the whole distal end portion of the catheter, when the balloon is not inflated, presents a relatively smooth surface of approximately uniform diameter for introduction through a lumenal structure within the body where the catheter is to be used.

The proximal end of the catheter tube is secured to a shut-off valve 30 having a rotatable valve member 31. The body of valve 30 is equipped with a conventional fitting 32 in line with the catheter tube socket 33 to receive a syringe 35 for inflating the balloon. Preferably, an incompressible fluid such as liquid is used and the transparent body of the syringe contains markings 36 so that the amount of liquid displaced into the balloon may be known but air may be used if desired. After the balloon has been inflated to the desired extent, the valve may be closed to hold the inflation.

The catheter is also equipped with a metal wire stylet 40. As indicated by broken lines in FIGURE 3, the distal end of the stylet extends to the proximal end of the reduced portion 12 of plug 11 whereby the stylet may be used when desired to facilitate the insertion of the catheter into a lumenal structure within the body. This provides two different pliabilities for the catheter body tube. The stylet is also used to protect the catheter when it is not in use. It stiffens the catheter body and prevents acute angulation when the catheter is being handled during sterilization and storage.

The proximal end of stylet 40 is secured in a cap 41 which is equipped with an internal thread 42 to engage hub flange elements 43 on the syringe fitting 32. When valve member 31 is turned to open position, the stylet may be freely inserted through the valve and secured in the catheter. Cap 41 also contains a vent opening 45 around thread 42 to relieve steam which may evolve from any liquid remaining in the catheter when it is heat sterilized. When it is gas sterilized, vent 45 allows for gas exchange. Since the stylet is contained within the metal coil 10, it does not come in contact with any soft plastic material which might scrape off and occlude the lumen regardless of how often or how carelessly the stylet may be inserted in the catheter.

The braided layer 15 performs several useful functions. When the catheter tube is tensioned in removing a thrombus from a vein with the balloon inflated, the braid provides a tension member to keep the coil 10 from elongating and assuming permanent deformation. Plastic tube 16 is relatively weak in tension and could not by itself effectively resist elongation of the body tube of the catheter. Also, if the stylet is in the catheter when the catheter is inserted in a lumenal structure in the body and the stylet end lies at winding 22 as it normally would, acute angulation in the balloon portion of the catheter might cause the end of the stylet to protrude through separated turns of the coil 10 and pierce the balloon or even the lumenal structure of the body. The braid prevents the turns from separating sufficiently to allow the stylet to protrude. Again, the braid prevents elongation and permanent deformation of the coil from balloon inflation to thereby prevent the stylet from passing between the turns of the coil when the stylet is inserted.

The coil 10 being substantially rigid in a radial direction provides a solid, incompressible base under windings 21 and 22 for the firm anchorage of both braid and balloon at these two points. The braid thereby provides positive restraint against elongation of both the coil and the balloon between these points. The radial rigidity of the coil prevents constriction of the catheter lumen under the windings, permitting them to be applied as tightly as may be necessary to insure the firm anchorage of the braid.

The braid is applied with its strands disposed at angles which make the braid effective as a tension member in the manner described. The braid does not impair the flexibility of the catheter body tube in normal bending for its intended purpose.

The same construction is used for an arterial embolectomy catheter except that tip plug 11 is shorter.

Having now described our invention and in what manner the same may be used, what we claim as new and desire to protect by Letters Patent is:

1. A catheter comprising a wire coil forming a lumen in the catheter, a plastic covering on said coil, a balloon surrounding the distal end portion of said coil, a soft and freely bendable tip on the catheter connected with the distal end of said coil, said tip comprising a plastic plug having a reduced proximal end portion secured in said distal end of said coil, said balloon having a non-inflatable closed end portion surrounding said plug, means securing the proximal end of the balloon over said plastic covering and means securing an intermediate portion of the balloon over the region of said reduced end portion of said plug, the portion of said balloon between said two securing means being inflatable.

2. A catheter adapted to proceed along a natural passageway within the human body, said catheter having proximal and distal ends and comprising a wire coil forming a lumen in the catheter, a plastic tip at said distal end for insertion into a body orifice or aperture, said tip being secured in the end of said coil, a plastic covering on said coil terminating short of said tip to expose a portion of said coil, a longitudinal tension member contained between said coil and said covering, and a balloon having a non-inflatable end portion enclosing the entire length of said tip and an inflatable portion to cover said exposed portion of the coil.

3. A catheter comprising a wire coil, a plastic tip having a proximal end portion secured in the end of said coil, a layer of braid surrounding said coil, a plastic covering on said braid terminating short of the distal end of said coil and braid, a balloon covering said tip and extending a short distance over said plastic covering, means securing the proximal end of the balloon on said plastic covering, and means securing an intermediate portion of the balloon over said proximal end portion of said tip, the portion of the balloon between said two securing means being inflatable.

4. A catheter as defined in claim 3 including a shut-off valve integral with the proximal end of the catheter, a fitting on said valve aligned with the catheter to receive a syringe for inflating the balloon, a stylet removably received in the catheter, a cap on said stylet arranged to engage said fitting, and a vent in said cap in communication with the lumen of the catheter.

5. A catheter as defined in claim 3 including a plastic shut-off valve having a socket on one end integrally connected with the proximal end of the catheter, a flanged tubular fitting on the opposite end of said valve aligned with said socket to receive a syringe for inflating the balloon, a stylet removably received in the catheter, a cap on said stylet having an internal thread to engage said flange, and a vent in said cap around said thread in communication with the lumen of the catheter.

6. A catheter adapted to proceed along a natural passageway within the human body, said catheter having proximal and distal ends and comprising a flexible wire coil forming a lumen in the catheter, a flexible plastic covering on said coil, said covering terminating short of said distal end to expose a portion of said coil, a soft plastic tip at said distal end for insertion into a body orifice or aperture, said tip being of sufficient length and flexibility to readily bend back on itself at a relatively sharp angle, and a balloon having a non-inflatable end portion enclosing the entire length of said tip and having an inflatable portion surrounding said coil between said covering and said tip.

7. A catheter adapted to proceed along a natural passageway within the human body having proximal and distal ends comprising an elongated tubular member having a leading closed tip at the distal end thereof for insertion into a body orifice or aperture and an opening at the proximal end adapted for connection thereto of a variety of surgical implements, said tubular member further comprising a flexible wire coil forming a metal-walled lumen, a flexible plastic covering on and completely surrounding said coil terminating short of the distal end of said coil, said tip being of a soft plastic and secured to the distal end of said coil, said tip projecting beyond the end of said coil and being of sufficient length and flexibility to readily bend back on itself at a relatively sharp angle, and an elastic sleeve secured around the external surface of said coil intermediate the tip and the distal terminus of said plastic covering, said sleeve being in fluid communication with said lumen through the wall of said coil whereby upon introduction of inflation fluid into said lumen, said sleeve will be expanded radially.

8. A catheter adapted to proceed along a natural passageway within the human body having proximal and distal ends comprising an elongated tubular member having a leading closed tip at the distal end thereof for insertion into a body orifice or aperture and an opening at the proximal end adapted for connection thereto of a variety of surgical implements, said tubular member further comprising a flexible plastic tube and a flexible wire coil extending from the distal end of said tube, said tip comprising a plastic plug secured in the distal end of said coil, an elastic sleeve secured around the external surface of said coil intermediate the tip and the distal terminus of said plastic tube, said sleeve being in fluid communication with said tube through the wall of said coil whereby upon introduction of inflation fluid into said tube, said sleeve will be expanded radially, and binding means on the end portions of said sleeve.

9. A catheter as defined in claim 8, said sleeve having a non-inflatable closed end enclosing said tip plug and distal end of said coil.

10. A catheter as defined in claim 8, said binding means on the distal end portion of the sleeve overlying the distal end portion of said coil.

11. A catheter as defined in claim 8, said wire coil extending out of the interior of said tube.

References Cited

UNITED STATES PATENTS

| | | | |
|---|---|---|---|
| 243,396 | 6/1881 | Pfarre | 128—349 |
| 419,926 | 1/1890 | Chapman | 128—349 |
| 705,346 | 7/1902 | Hamilton | 128—344 |
| 2,210,744 | 8/1940 | Winder | 128—349 |
| 2,687,731 | 8/1954 | Iarussi et al. | 128—349 |
| 3,128,769 | 4/1964 | Scislowicz | 128—348 |
| 3,189,031 | 6/1965 | Andersen | 128—350 |

FOREIGN PATENTS

| | | |
|---|---|---|
| 418,525 | 9/1925 | Germany. |
| 15,231 | 1896 | Great Britain. |
| 186,005 | 9/1922 | Great Britain. |

OTHER REFERENCES

U.S.C.I. Catalogue (1964), pp. 27, 38 and 43 relied on.

DALTON L. TRULUCK, Primary Examiner

U.S. Cl. X.R.

128—341